Jan. 18, 1966     R. L. YUENGER ET AL     3,229,985
MATERIAL UNLOADING AND SPREADING DEVICE
Filed Dec. 11, 1964     5 Sheets-Sheet 1
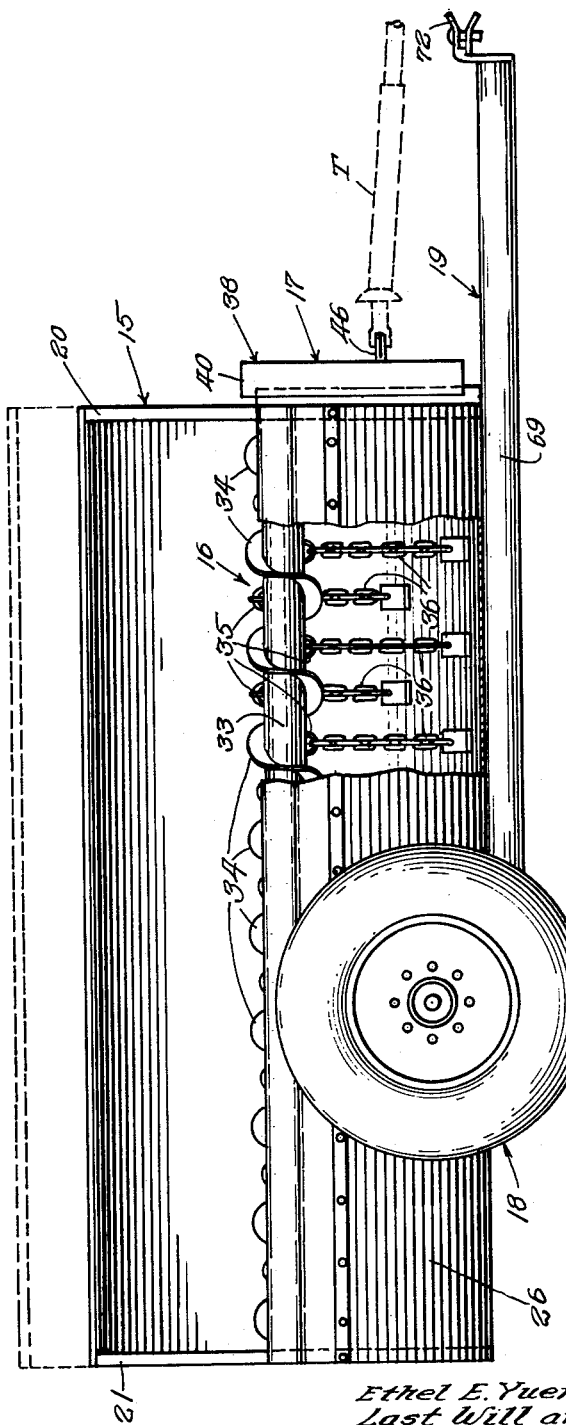
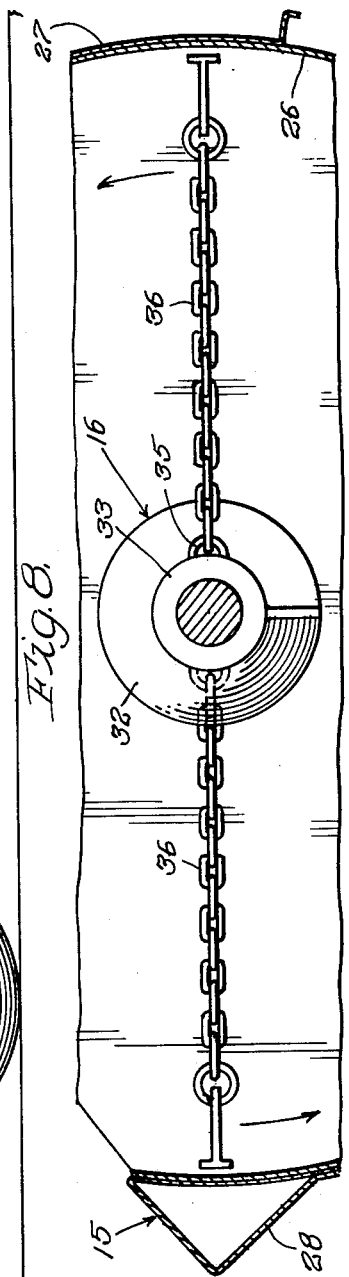
Inventors:
Howard J. Ferris
Robert G. Ferris
Ethel E. Yuenger, Executor of the
Last Will and Testament of
Robert L. Yuenger
By: Hofgren, Wegner, Allen, Stellman & McCord
Attorneys

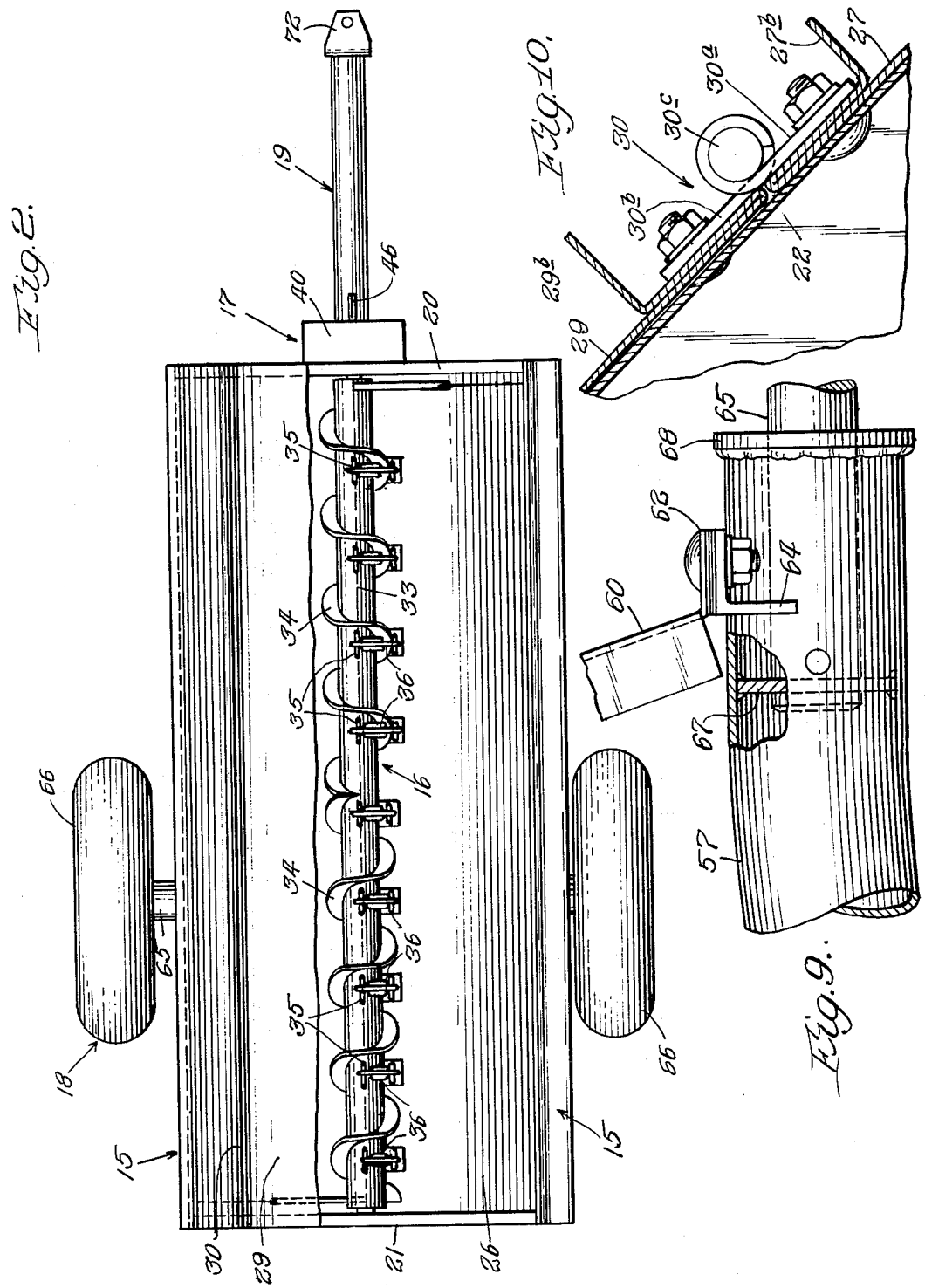

Jan. 18, 1966 R. L. YUENGER ET AL 3,229,985
MATERIAL UNLOADING AND SPREADING DEVICE
Filed Dec. 11, 1964 5 Sheets-Sheet 3

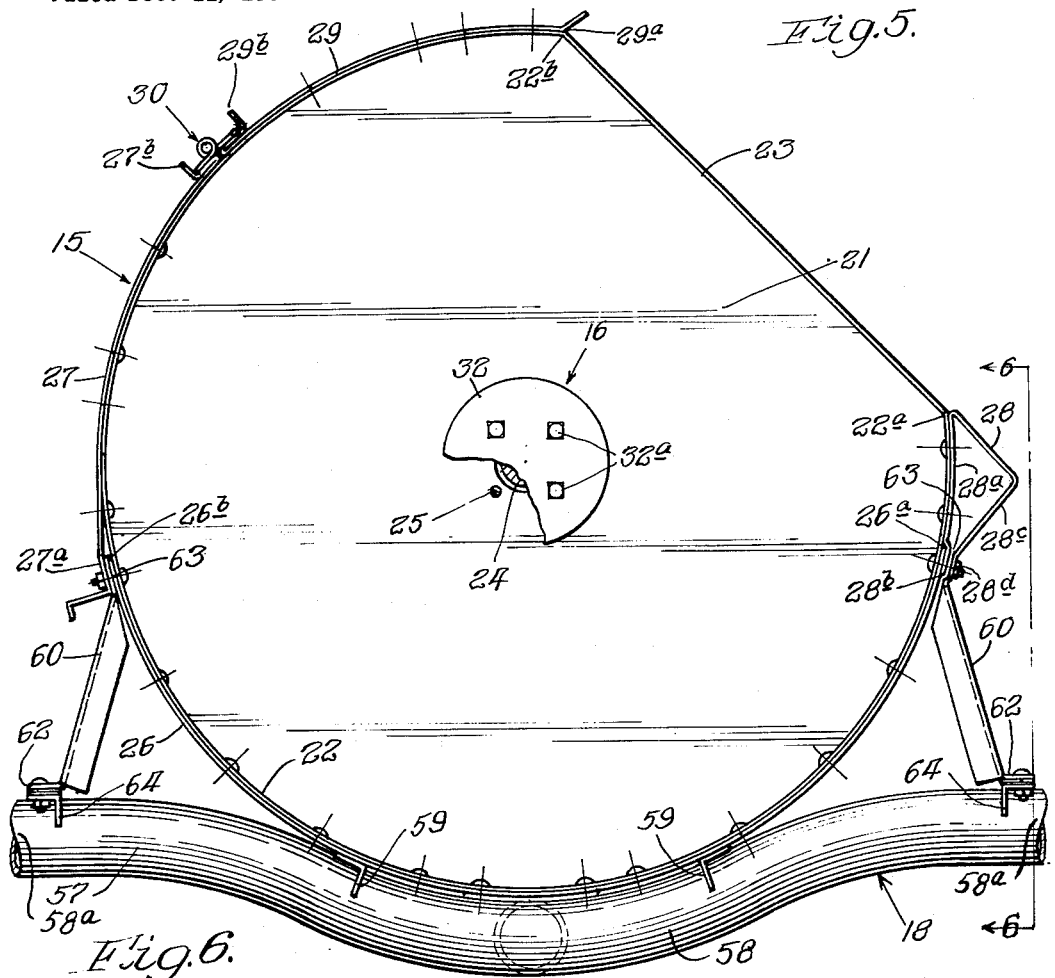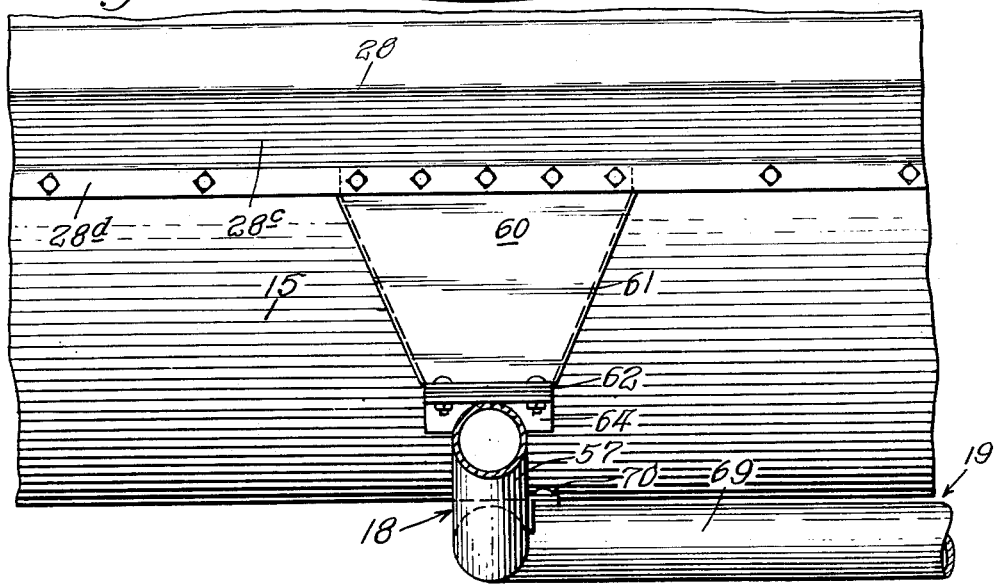

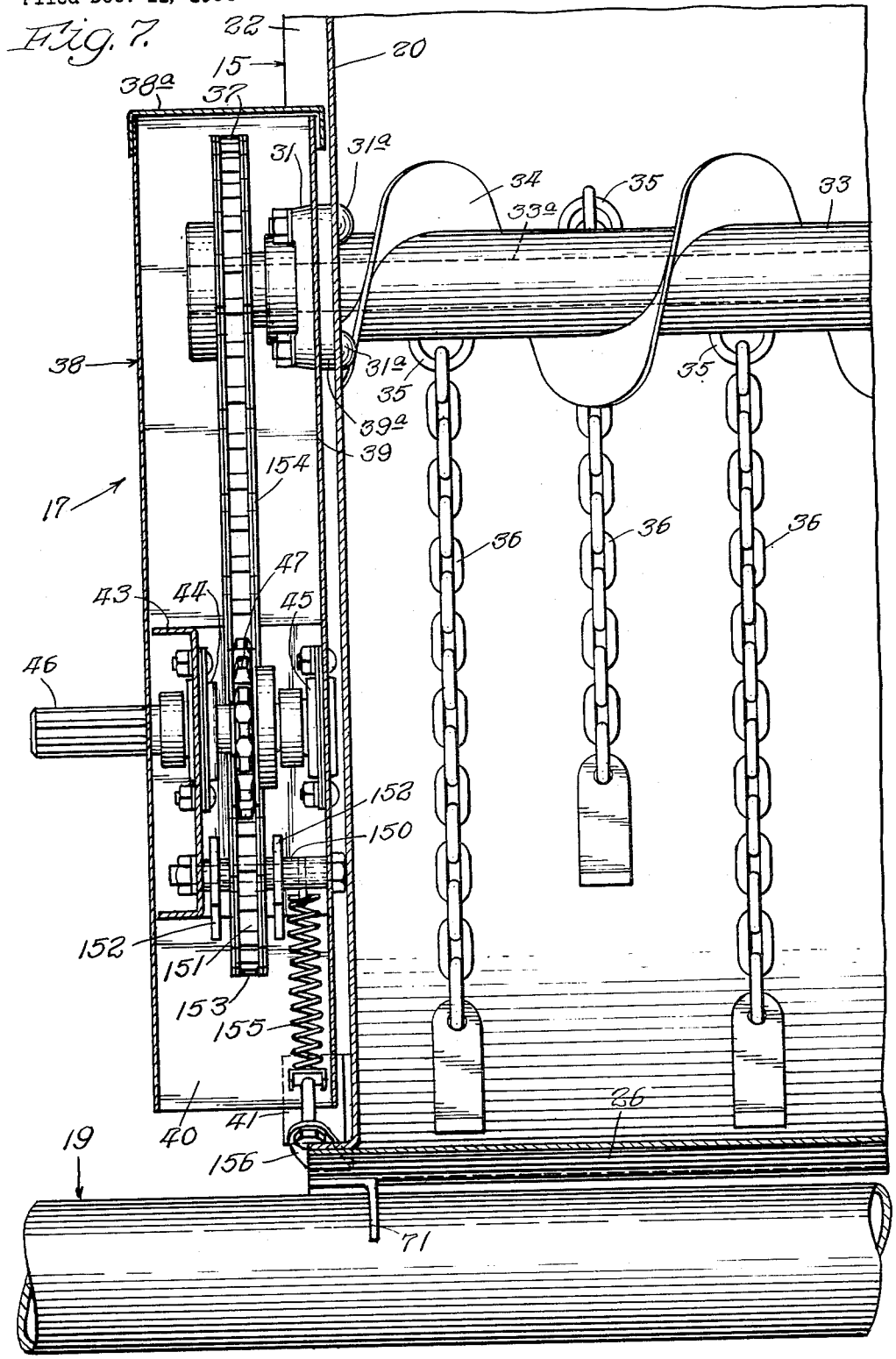

United States Patent Office 3,229,985
Patented Jan. 18, 1966

3,229,985
MATERIAL UNLOADING AND
SPREADING DEVICE
Robert L. Yuenger, deceased, late of Harvard Ill., by Ethel E. Yuenger, executor, Harvard, Ill., Howard J. Ferris, Gulfport, Fla., and Robert G. Ferris, Harvard, Ill., assignors to Starline, Inc., Harvard, Ill., a corporation of Illinois
Filed Dec. 11, 1964, Ser. No. 419,280
16 Claims. (Cl. 275—3)

The present invention constitutes an improvement upon the basic unloading and spreading device disclosed and claimed in Elwick Patent No. 3,048,409, and is a continuation-in-part of our co-pending patent application Serial No. 223,618, filed September 14, 1962, now abandoned.

This invention relates to a material unloading and spreading device of the type in which a generally cylindrical container is provided with a longitudinal unloader shaft having flexible flail members which fling material out of the container.

Spreaders of the type disclosed in the above Elwick patent are normally loaded by being driven beneath the elevated end of a barn gutter cleaner conveyor which is operated to load gutter refuse into the spreader container. The spreader unloads on the right-hand side, and thus must be loaded from that side because of the upwardly extending wall portion and hinged hood which form the upper quadrant of the left-hand side of the container. The commercial sale of spreaders constructed in accordance with the above Elwick patent has been limited to farms where the discharge end of the barn gutter cleaner is so positioned as to permit the spreader to be drawn by a tractor into a location with its right side toward the gutter cleaner discharge. Accordingly, there have always been certain farms where the spreader of said Elwick patent cannot be used.

A principal object of the present invention, therefore, is to provide a side spreader in which the container may be readily mounted upon its carriage with the discharge opening selectively either to the right or to the left of a vertical plane through the unloader shaft, and in which said shaft may be driven selectively clockwise for right-hand unloading or counterclockwise for left-hand unloading.

A further object of the invention is to provide a container structure in which the right-hand or left-hand position of the discharge opening is achieved by forming the unloader container from two end panels and a plurality of body members which may be selectively assembled so as to position the discharge opening in the desired location.

Yet another object of the invention is to provide a spreader of the defined type which may be shipped in a knocked-down condition and in which all of the container elements, which constitute a major percentage of the total weight of the assembled unit, are merely cut and formed sheet metal elements which may be shipped at the freight rate applicable to unfabricated components.

Still another object of the invention is to provide a spreader which may be shipped knocked-down, and which may be readily assembled by a farmer using only the simple and readily available tools such as screwdrivers and wrenches.

A further object of the invention is to provide a spreader having a frame that includes a drop center ox-bow axle the central portion of which is lower than the wheel spindles and which has relatively high clearance areas between the wheels and the container so as to permit operation of the unit among growing row crops up to about 18 inches in height, while the container is relatively low so as to facilitate loading.

The invention is illustrated in a preferred embodiment in the accompanying drawings in which:

FIG. 1 is a right side elevational view of the device of the invention arranged for right side discharge, and with a portion of the container wall broken away to show the unloader shaft and flail chain;

FIG. 2 is a top plan view of the unit arranged for right side discharge;

FIG. 5 is a fragmentary rear elevational view of the device, on an enlarged scale, arranged for right side discharge;

FIG. 6 is a fragmentary section taken substantially as illustrated along the line 6—6 of FIG. 5;

FIG. 7 is a fragmentary section on an enlarged scale taken substantially as illustrated along the line 7—7 of FIG. 4;

FIG. 8 is a fragmentary transverse section on an enlarged scale, showing the flails in their fully extended positions;

Figure 3:
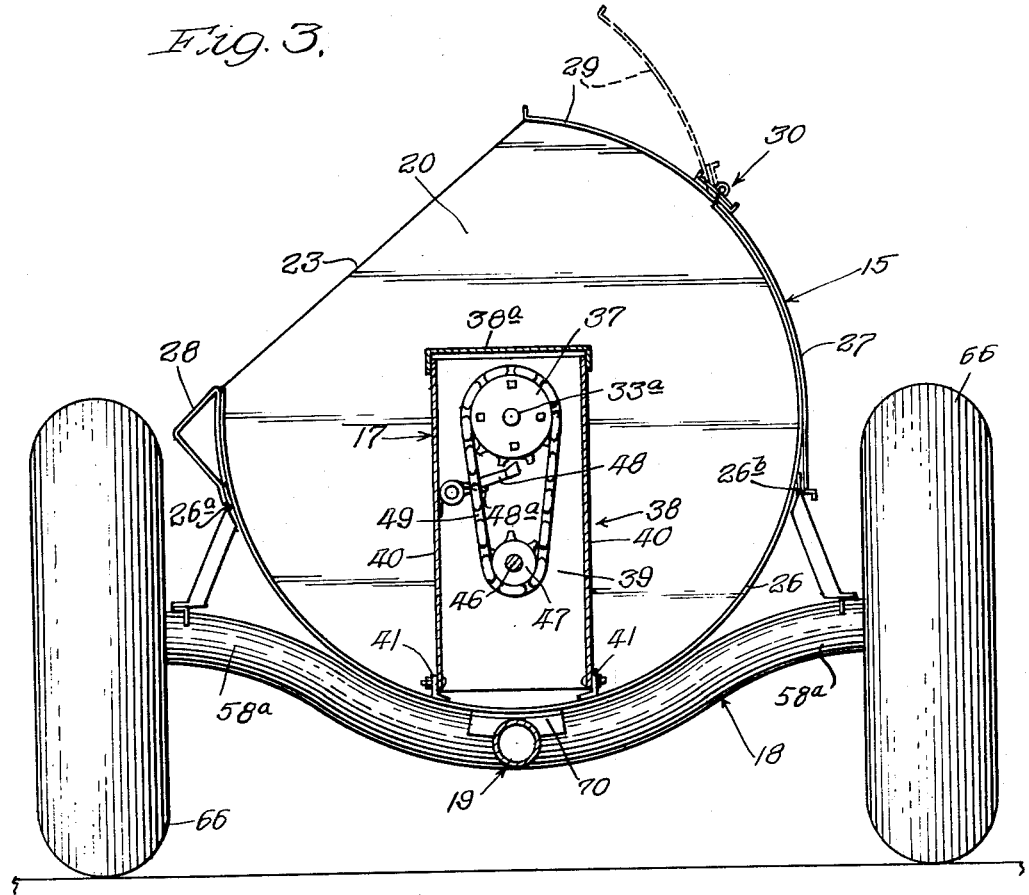
FIG. 3 is a front elevational view of the device arranged for right side discharge.

FIG. 9 is a fragmentary front elevational view, partially in section, on an enlarged scale, showing the mounting of an axle in the cross-frame member of the unit, and the connection between the cross-frame member and the diagonal brace element; and FIG. 10 is a fragmentary section on an enlarged scale showing a detail of the detachable hinge connection between one of the container panels and a hinged hood on the container.

Referring to the drawings in greater detail, and referring first to FIGS. 1 and 2, the device of the present invention is seen to consist generally of a container, indicated generally at 15; an unloader shaft assembly, indicated generally at 16, which is supported at the end walls of the container; power transmission means, indicated generally at 17, which is mounted on a front end wall of the container and is adapted to drive the unloader shaft assembly from a tractor power takeoff T, shown in broken lines in FIG. 1; a wheeled carriage 18 upon which the container 15 is mounted; and a hitch tongue 19 which is secured to the carriage assembly 18 and the underside of the container 15, and extends forwardly for attachment to a tractor drawbar.

Referring now particularly to FIGS. 1, 2, 3 and 5, all of which illustrate the unit with the container 15 arranged for right side discharge, the container 15 is seen to include integral front and rear end walls 20 and 21. As best seen in FIG. 5, each of the end walls has an out-turned flange 22 which extends for approximately 270° around the circumference of the wall, and a straight side 23 which cuts a chord between opposite extremities 22a and 22b of the flange 22. Each of the end walls is provided with an axially positioned bearing hole 24, and surrounding the bearing hole are four bolt holes 25 which are located at the corners of a square.

The flanges 22 of end walls 20 and 21 are punched to receive fastening bolts for an arcuate bottom panel 26, and arcuate supplemental panel 27, and a longitudinal reinforcing member 28, each of which is formed from a single piece of sheet metal. The arcuate bottom panel 26 has parallel, longitudinal margins 26a and 26b which are seen to be equidistant from a horizontal plane through the axis of end wall 21 so that the bottom panel occupies less than 180° of a circle. Thus, when a plurality of spreader units are being shipped in knocked down form, the bottom panels 26 may be stacked one upon another without springing the panels.

Arcuate supplemental panel 27 has a lower marginal portion 27a which is slightly offset outwardly so as to overlap the edge 26b of the arcuate bottom panel 26, and the two panels are secured together along their overlapping longitudinal edge portions, while the ends of the panel 27 are also bolted to the out-turned flange 22 upon each of the end walls 20 and 21.

Reinforcing member 28 is triangular in cross-section, and is bent from a single piece of sheet metal. It includes an inner wall 28a having an offset portion 28b which overlaps the margin 26a of the arcuate bottom panel 26, and a second wall 28c of the reinforcing member has an out-turned fastening flange 28d which confronts the flange 28b, so that the reinforcing member may be bolted along the entire longitudinal edge 26a of the bottom panel by means of bolts which extend through the bottom panel and through the offset flanges 28b and 28d.

The container 15 also includes a hood 29 which is detachably hingedly connected at 30 to the upper end of supplemental panel 27, and has its free 29a substantially at the upper end 22b of the wall flange 22. Thus, when the hood 29 is closed it cooperates with supplemental panel 27 to provide supplemental panel means which encloses approximately one-quarter of the circumference of the container.

Referring particularly to FIG. 10, the upper marginal portion of supplemental panel 27 is seen to be doubled back upon itself and provided with an out-turned flange 27b, while the lower marginal portion of hood 29 is also doubled back upon itself and provided with an out-turned flange 29b. Hinge elements 30a and 30b are bolted, respectively, to the upper end of panel 27 and to the lower end of hood 29, and a hinge pin 30c extends through loops in the hinge members 30a and 30b to hingedly connect the hood 29 with the panel 27. When the hood 29 is pivoted to its open position the hood flange 29b bears against the panel flange 27b to limit the arc of movement of the hood and avoid any strain upon the hinge assembly 30.

Figure 4:
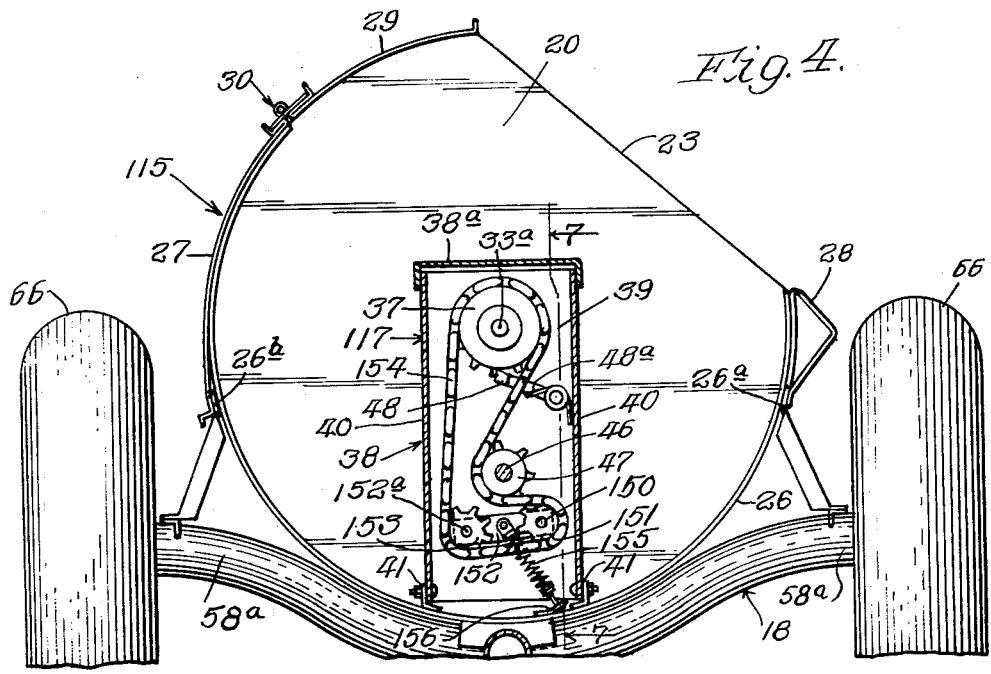
FIG. 4 is a front elevational view of the device arranged for left side discharge.

In FIGS. 3 and 5 the container 15 is arranged for right side discharge, while the container 115 of FIG. 4 is arranged for left side discharge. Comparison of FIGS. 3 and 4 shows that for left side discharge, end panels 20 and 21 are rotated 90° about their axes, so that the chords 23 which define the ends of the container discharge opening occupy a different upper quadrant of a circle for left side discharge than for right side discharge. Likewise, the positions of the supplemental panel means (panel 27 and hood 29), and of the reinforcing member 28 are reversed, the reinforcing member in the right side discharge unit being along the margin 26a of the bottom panel 26, while in the left side discharge container 115 the reinforcing member is along the margin 26b.

As best seen in FIG. 5, all the bolt holes in the end wall flanges 22 are so located that the 90° axial rotation of the end walls still leaves bolt holes in the flanges located in the proper positions to receive all the fastening bolts for the panels 26 and 27 and the reinforcing member 28.

As best seen in FIG. 1, 2, 5 and 7, unloader shaft assembly 16 includes a front annular bearing assembly 31 which is mounted on front wall 20 by means of bolts and nuts 31a which extend through the bolt holes 25 to position the annular bearing assembly 31 surrounding the bearing holes 24 in the wall. Similarly, a blind bearing assembly 32 is mounted by means of bolts and nuts 32a so as to overlie the bearing hole 24 of rear wall 21, and an unloader shaft 33 is journalled in the bearing assemblies 31 and 32 with its forward end 33a forward of wall 20. Unloader shaft 33 is provided with a helical feed screw 34 and with mounting eyes 35 to receive flail chains 36. As best seen in FIG. 7, an input sprocket 37 is detachably fixed to the projecting forward end 33a of unloader shaft 33.

Proper discharge of the material from the container requires the flails 36 traverse the container discharge opening from top to bottom, and accordingly, the unloader shaft 33 must rotate in one direction for a right side discharge unit and in the opposite direction for a left side discharge unit. Since most tractor power take-offs may be driven in only one direction, the device of the present invention is provided with a power transmission assembly which may be readily modified to drive the unloader shaft in the desired direction.

Referring particularly to FIGS. 3, 4 and 7, a power transmission assembly 17 for right side discharge and an assembly 117 for left side discharge have many parts in common. A box-like sheet metal power transmission mounting member 38 has a rear wall 39 which is secured to container front wall 20 by means of the same bolts 31a and nuts which are used for mounting the annular front bearing assembly 31, and a spacer 39a is provided between front container wall 20 and rear wall 39 of the power transmission mounting box. Side walls 40 of the box 38 are provided with depending brackets 41 which rest upon front panel flange 22 and support most of the weight of the transmission mounting box 38. As best seen in FIG. 7, an input bracket 43 which is of generally channel shape extends between the end walls 40 of the power transmission mounting box 38 to support an annular bearing assembly 44 which cooperates with a blind bearing assembly 45 mounted on box back wall 39 to journal an input shaft 46 which projects forwardly out of box 38 for connection to the power take-off T of a tractor. Input shaft 46 mounts a sprocket 47 which is in the same vertical plane as the drive sprocket 37 of the unloader shaft 33.

The foregoing components are all common both to the power transmission assembly 17 and to the power transmission assembly 117. Also common to both assemblies is an anti-reverse pawl assembly 48 which is mounted on one of the two side walls 40 of the power transmission mounting box 38, and which in either position is urged into engagement with the unloader shaft drive sprocket 37 by a spring 48a. In either case, the pawl engages the teeth of drive sprocket 37 so as to prevent reverse rotation of the unloader shaft 33 when the flail chains 36 are wound around the shaft preparatory to loading the container.

The power transmission 17 for right side discharge has a roller chain 49 which is trained over input sprocket 47 and drive sprocket 37 so as to drive the unloader shaft 33 in the same direction as the input shaft 46. This direction of rotation is counterclockwise as viewed in FIG. 3, or clockwise as viewed in FIG. 5, and causes the flails 36 to traverse the right side discharge opening from top to bottom.

The left side discharge unit of FIG. 4 requires that the drive sprocket 37 be driven clockwise as viewed in FIG. 4, and thus requires rotation opposite to that of input shaft 46. Accordingly, as seen in FIGS. 4 and 7, a supporting stud 150 is carried on the rear wall 39 of the transmission support box, and on bracket 43, and supported upon stud 150 are an idler sprocket 151 and a bifurcated, pivoted sprocket arm 152 at the free end of which is a fixed shaft 152a to receive a second idler sprocket 153. A roller chain 154 is wrapped around drive sprocket 37 of the unloader shaft 33, around the idler sprockets 153 and 151, and is back wrapped around input sprocket 47. A chain tensioning spring 155 is stretched between the bifurcated arm 152 and a spring bracket 156 on front wall flange 22 of the container so as to maintain adequate tension upon roller chain 154.

Preferably the transmission assembly mounting box 38 is provided with aremovable dust cover 38a.

Referring now particularly to FIGS. 5 and 9, the wheeled carriage 18 consists of a one-piece cross-frame in the form of a piece of pipe 57, the central portion 58 of which is curved downwardly to provide a yoke-like, or drop center ox-bow arrangement, the central portion of which conforms to the curve of arcuate bottom panel member 26; and a pair of angle members 59 which extend longitudinally beneath container bottom panel 26 are arcuately notched to conform to the curvature of cross-frame pipe 57. A pair of identical inclined braces 60 have webs 61 (FIG. 6) which extend longitudinally with respect to the container, while angularly out-turned fastening flanges 62 and 63 at the lower and upper ends, respectively, of braces 60 are bolted to the cross-frame 57 and to the upper marginal portions 26a and 26b of the container bottom panel 26. As best seen in FIGS. 6 and 9, the bottom flanges 62 of the inclined braces 60 are bolted to angle members 64 which are arcuately notched to fit the cross-frame pipe 57, and which are welded to said pipe. The upper end 63 of one inclined brace 60 is secured between the lower marginal portion 27a of the supplemental panel 27 and the overlapping marginal portion of the bottom panel 26, while the upper end 63 of the opposite inclined brace 60 extends between the fastening flanges 28b and 28d of the triangular reinforcing member 28.

As best seen in FIG. 9, stub axles 65 for conventional pneumatic tired vehicle wheels 66 extend into the ends of the cross-frame pipe 57 and are fixedly supported in an inner web 67 which is welded within the pipe, and an annular plate 68 which is welded over the end of the pipe.

As best seen in FIG. 5, the extremities 58a of the drop-center ox-bow member 58 extend nearly horizontally inwardly from the wheels to lines which are between vertical planes through the widest part of the container, and the member then begins to curve downwardly to carry the container. This affords a definite advantage over anything disclosed in the prior art, because it drops the container for relatively easy loading while affording two areas of relatively high ground clearance between and adjacent the wheels for operating the unit in growing row crops.

The structure disclosed in Wilkes Patent 3,121,568 has a straight axle, so that with the 18-inch or twenty-inch wheels and 9-inch tires commonly used on devices of this character, the bottom of the container is about 40 inches or 42 inches off the ground. This places the container opening too high for easy loading.

An alternative is to use a low cross-frame member having only 10-inch clearance, and place spindle blocks on the ends of the member to carry the wheel spindles. This gives convenient container height for loading, but inadequate clearance for fertilizing row crops.

The present structure has only the 10-inch clearance at the middle, but has 16-inch to 18-inch clearance beneath the extremities 58a of the frame member; and the minimum space between the high clearance areas at the ends of the frame member is about 38 inches, with a tread width of 6 feet. Row crops are commonly planted with a 40-inch spacing on centers. Thus, the carriage has a tread width which is greater than the space between two adjacent rows of conventionally planted row crops and substantially less than the center-to-center space of four such rows, so the carriage may span two adjacent rows of crops and the wheels run between said rows; and the two adjacent rows of such crops are in the high clearance areas between the wheels when the carriage spans said rows.

As best seen in FIGS. 1, 6 and 7, the tongue assembly 19 comprises a piece of pipe 69 which extends longitudinally beneath the container. The rear of the pipe 69 is bolted to a bracket 70 (FIGS. 3 and 6) welded on cross-frame pipe 57, while a forward portion of the pipe 69 is best seen in FIG. 7 to be provided with a transversely extending bracket 71 which is bolted to a forwardly extending flange 22 of container front wall 20. At the forward extremity of the pipe 69 is a pintle assembly 72 which may be connected to the drawbar of a tractor.

It is apparent from the foregoing detailed description that the present invention affords a very inexpensive and simple assembly of component parts which may be put together in either one of two ways to provide either a right side or a left side discharging spreader; and that the drop-center ox-bow frame affords practical operating advantages not found in any of the prior art devices.

The foregoing detailed description is given for clearness of understanding only and no unnecessary limitations should should be understood therefrom, as modifications will be obvious to those skilled in the art.

We claim:

1. A side unloading material distributing device comprising, in combination: a wheeled carriage; a material container mounted on said carriage, said container including front and rear end wall members provided with aligned axial bearing members, arcuate bottom panel means which is concentric with the axis of said bearing members and has upper edges at both sides of the carriage not substantially below a horizontal plane through said axis, and arcuate supplemental panel means concentric with said axis and detachably secured to, and in circumferential alignment with one of said upper edges, said supplemental panel means including a fixed panel member which is detachably secured to an upper edge of the bottom panel means, and a hood member hingedly mounted on the upper edge of the fixed panel member and having an upper edge which cooperates with an upper edge of the bottom panel means to define the longitudinal margins of a material discharge opening which occupies a portion of the upper half of a circle struck about said axis, said opening being selectively either to the right or to the left of a vertical plane through said axis depending upon the position of said supplemental panel means on the bottom panel means; an unloader shaft journaled in said bearing means and having an end extending forwardly of said front end wall; a plurality of flails on said unloader shaft; and means for driving said shaft from a tractor power take-off in a discharge direction with the flails traversing the discharge opening from top to bottom.

2. The device of claim 1 in which a reinforcing member is detachably secured along the upper edge of the bottom panel means opposite the supplemental panel means.

3. In a side unloading material distributing device which is adapted for shipping in a knock-down condition, in combination: a pair of identical front and rear walls having aligned axial bearing holes, said walls having registering arcuate margins each provided with a flange that is concentric with said holes; an arcuate bottom panel which has parallel longitudinal margins, said panel having opposite ends detachably secured to said flanges; a reinforcing member and arcuate supplemental panel means detachably secured along opposite longitudinal margins of the bottom panel and detachably secured to said flanges, said reinforcing member being not substantially below a horizontal plane through the centers of the holes in the end walls, said end walls, said bottom panel, said panel means and said member cooperating to provide a material container with a longitudinal discharge opening that has a bottom margin formed by said member and a top margin formed by the free edge of the supplemental panel means, and said reinforcing member and supplemental panel means each being constructed to be mounted selectively on either of the two longitudinal margins of the bottom panel in order to locate the discharge opening of the container selectively either to the right or to the left of a vertical plane through the axis of the container; a rotatable unloader shaft removably mounted in said bearing holes with a forward end extending through the front end wall; a plurality of flails on the unloader shaft; and means including a removable power input member on the forward end of the shaft for driving said shaft from a tractor power take-off in a discharge direction with the flails traversing the discharge opening from top to bottom.

4. The device of claim 3 which includes a two-wheeled carriage having a single drop-center ox-bow cross-frame member at the ends of which the wheels are journalled and on which said container is detachably mounted, and longitudinal hitch means, the rear end of which is secured to the cross-frame member and an intermediate portion of which is secured to the flange on the container front wall, said hitch means projecting forwardly of said front wall for connection to a tractor hitch.

5. The device of claim 3 in which the supplemental panel means includes a supplemental panel which has a lower margin detachably connected to the bottom panel, and a hood member detachably hingedly connected to the upper margin of the supplemental panel, the free edge of the hood member forming the upper edge of the material discharge opening.

6. In a material distributing device which is adapted for shipping in a knock-down condition, a container comprising, in combination: a pair of identical one-piece sheet metal end walls having aligned axial bearing holes, said walls having aligned arcuate margins each provided with an integral flange that is concentric with said bearing hole; a one-piece sheet metal arcuate bottom panel which has parallel longitudinal margins, said panel having opposite ends detachably secured to said flanges; a one-piece elongated hollow sheet metal reinforcing member and arcuate supplemental sheet-metal panel means detachably secured along opposite longitudinal margins of the bottom panel and detachably secured to said flanges, said reinforcing member enclosing a space that is polygonal in cross-section and being not substantially below a horizontal plane through the centers of the bearing holes, said end walls, said bottom panel, said panel means and said member cooperating to provide a material container with a longitudinal discharge opening that has a bottom margin formed by said member and a top margin formed by the free edge of the supplemental panel means.

7. The device of claim 6 in which the supplemental panel means includes a one-piece supplemental panel which has a lower margin detachably connected to the bottom panel, and a one-piece hood member detachably hingedly connected to the upper margin of the supplemental panel, the free edge of the hood member forming the upper edge of the material discharge opening.

8. The device of claim 6 in which the reinforcing member has overlapping free edge portions which are secured together by bolts that also secure the reinforcing member to the bottom panel.

9. In a side loading and unloading material distributing device, in combination: a two-wheeled carriage having a single oxbow cross-frame member with generally horizontal extremities and a downwardly curved central portion, stub axles secured in and projecting from the ends of said member, wheels journaled on said stub axles, and hitch means secured at its rear end to said member and having a forward end on the median plane between the wheels, said carriage having a tread width which is greater than the space between two adjacent rows of conventionally planted row crops and substantially less than the center-to-center space of four such rows, so the carriage may span two adjacent rows of crops and the wheels run between said rows and the next adjacent rows; a generally cylindrical container positioned between said wheels and having an arcuate wall resting on and in contact with a substantial part of the central portion of the frame member, said container having front and rear end walls and a side opening through which material may be loaded and unloaded, the extremities of said frame member providing two areas of such high ground clearance between and adjacent the wheels, and of such width that two adjacent rows of growing row crops are in said areas when the carriage spans said rows, and the downwardly curved central portion of said cross frame member being relatively low to place the container side opening low and thus facilitate loading; means detachably securing the container to the frame member, said means including a pair of separate lateral braces detachably secured at opposite ends to the container and to the frame member; means detachably securing the front wall of the container to an intermediate portion of the hitch means; an unloader shaft journaled in said end walls and having an end extending forwardly of said front end wall; a plurality of flails on said unloader shaft; and means for driving said shaft from a tractor power take-off in a discharge direction with the flails traversing the discharge opening from top to bottom.

10. The combination of claim 9 in which the container is of sheet metal, the end walls have out-turned flanges, an arcuate bottom panel is detachably secured at its ends to said flanges, said bottom panel forming slightly less than 180° of the circumference of the cylinder, a hollow sheet metal reinforcing member is detachably secured along one longitudinal margin of the bottom panel and has an upper surface substantially on a horizontal plane through the longitudinal axis of the cylinder, and supplemental panel means is detachably secured to the other longitudinal margin of the bottom panel and has an upper edge substantially on a vertical plane through said axis, said free edge and said upper surface defining the longitudinal margins of the side opening.

11. The combination of claim 10 in which the supplemental panel means includes a supplemental panel secured to the bottom panel and to the end wall flanges, and a hood member detachably hingedly connected to the upper margin of the supplemental panel.

12. In a material distributing device which is adapted for shipping in a knock-down condition, in combination: a two-wheeled carriage; and a cylindrical container detachably mounted on the carriage, said container having identical substantially circular one-piece sheet metal end walls having integral outturned flanges, a one-piece sheet metal bottom panel forming slightly less than 180° of the circumference of the cylinder, the ends of said bottom panel being bolted to said flanges, a one-piece sheet metal reinforcing member extending the length of the bottom panel and enclosing a space that is polygonal in cross-section, said reinforcing member having overlapping free edge portions bolted along one upper margin of the bottom panel and having an upper surface not substantially below a horizontal plane through the longitudinal container axis; a one-piece sheet metal supplemental panel bolted to the other upper margin of the botom panel and to said flanges; a one-piece sheet metal cover member; and hinge means detachably pivotally connecting said cover member to the upper edge of the supplemental panel, the free edge of the cover member and the upper surface of the reinforcing member defining the longitudinal margins of a discharge opening which occupies no more than about 90° of the circumference of the container.

13. The combination of claim 12 which includes a pair of one-piece sheet metal lateral braces each of which has a bottom flange bolted to the carriage and an upper portion bolted to the container.

14. The combination of claim 12 in which each end wall has an aperture on the longitudinal axis of the container, there are bolt holes surrounding said aperture, and in which shaft bearings are bolted in said openings.

15. The combination of claim 12 in which the longitudinal axis of the container extends runwise of the carriage, the carriage has a single ox-bow frame member with a downwardly curved central portion a substantial length of which is in contact with the container bottom panel, stub axles at the ends of the frame member on which the wheels are journalled, longitudinal hitch means the rear end of which is detachably connected to the frame member, and in which the forward of the two container end panels has its flange bolted to an intermediate portion of the hitch means.

16. In a side unloading material distributing device, in combination: a two-wheeled carriage; a substantially cylindrical material container detachably secured to the carriage, said container having front and rear end walls with openings on the longitudinal axis of the container and a plurality of arcuate panels detachably secured to one another and to said end walls; a pair of bearings detachably mounted in said openings; an unloader shaft journalled in said bearings and having a forward portion projecting through the bearing on the front wall; a plurality of axially spaced flexible flail members mounted on the shaft and adapted to have their free ends sweep the circumference of the container when the shaft is rotated; a drive sprocket keyed on the front end portion of the unloader shaft; a bracket detachably mounted on the front end wall below the drive sprocket, an input shaft journalled in said bracket in the same vertical plane with the unloader shaft and having a forward portion adapted to make a driving connection with the power take-off of a tractor; an input sprocket keyed on said input shaft; an idler bracket detachably secured to the front wall below the input shaft; a pair of idler sprockets rotatably mounted on said idler bracket; a drive chain wrapped directly around the drive sprocket and the idler sprockets and back wrapped around the input sprocket; hitch means on said carriage; and means detachably securing the front of the container to an intermediate portion of the hitch means.

References Cited by the Examiner

UNITED STATES PATENTS

| | | |
|---|---|---|
| 1,101,878 | 6/1914 | Newbert. |
| 3,121,568 | 2/1964 | Wilkes et al. _____ 275—3 |

References Cited by the Applicant

UNITED STATES PATENTS

| | | |
|---|---|---|
| 709,705 | 9/1902 | Grosvenor et al. |
| 759,364 | 5/1904 | Freeland. |
| 858,177 | 6/1907 | Harry. |
| 1,327,917 | 1/1920 | Kellar. |
| 2,074,523 | 3/1937 | Thwaits. |
| 2,110,262 | 3/1938 | Curtis. |
| 2,372,981 | 4/1945 | Quilter. |
| 2,537,219 | 1/1951 | Girton. |
| 2,664,221 | 12/1953 | Seltzer. |
| 2,729,313 | 1/1956 | Ernestus. |

FOREIGN PATENTS

| | |
|---|---|
| 689,928 | Great Britain. |
| 338,343 | Italy. |

ABRAHAM G. STONE, *Primary Examiner.*

WILLIAM A. SMITH, III, *Examiner.*